(12) United States Patent
Wu

(10) Patent No.: US 7,422,035 B2
(45) Date of Patent: Sep. 9, 2008

(54) FLAT PIPE SUITABLE FOR VARIABLE FLOW CAPACITY

(75) Inventor: Shih Ming Wu, Chang Hua (TW)

(73) Assignee: B.H. Show Co., Ltd., Chang Hua Hsien (TW)

( * ) Notice: Subject to any disclaimer, the term of this patent is extended or adjusted under 35 U.S.C. 154(b) by 0 days.

(21) Appl. No.: 11/737,218

(22) Filed: Apr. 19, 2007

(65) Prior Publication Data

US 2008/0072983 A1    Mar. 27, 2008

(30) Foreign Application Priority Data

Sep. 21, 2006  (TW) .............................. 95216906 U

(51) Int. Cl.
*F16L 11/00* (2006.01)

(52) U.S. Cl. ...................... 138/118; 138/115; 138/116; 138/117

(58) Field of Classification Search ................. 138/115, 138/116, 117, 118, 119; 285/124.1, 124.4; D23/266

See application file for complete search history.

(56) References Cited

U.S. PATENT DOCUMENTS

| 2,151,540 | A | * | 3/1939 | Varga | ......................... | 138/117 |
|---|---|---|---|---|---|---|
| 2,798,745 | A | * | 7/1957 | Nelson | ................... | 285/148.13 |
| 3,567,134 | A | * | 3/1971 | Smith | ......................... | 239/547 |
| 4,120,347 | A | * | 10/1978 | Molnar | ...................... | 165/48.1 |
| D287,284 | S | * | 12/1986 | Pavy | ......................... | D25/122 |
| 5,423,353 | A | * | 6/1995 | Sorensen | .................... | 138/109 |
| 5,447,110 | A | * | 9/1995 | Brown | .......................... | 141/2 |
| 5,662,144 | A | * | 9/1997 | Lo et al. | ..................... | 138/119 |
| 5,924,456 | A | * | 7/1999 | Simon | ......................... | 138/122 |
| 5,996,639 | A | * | 12/1999 | Gans et al. | .................. | 138/115 |
| D475,439 | S | * | 6/2003 | Lin | ........................... | D23/266 |
| 6,692,037 | B1 | * | 2/2004 | Lin | ......................... | 285/124.1 |
| D498,825 | S | * | 11/2004 | Fu | ............................ | D23/266 |

* cited by examiner

*Primary Examiner*—Patrick F Brinson
(74) *Attorney, Agent, or Firm*—Ming Chow; Sinorica, LLC

(57) ABSTRACT

A flat pipe with variable flow capacity comprises a main body shaped as a flat tube wherein opposing ridges are installed at the inner upper and lower positions of the main body, and thin-film spacers are installed between said pairs of ridges, forming multiple passages in the main body. Due to the flexibility of the thin-film spacers, the passages of the main body may stretch to a larger diameter to adjust to increased flow. If the flow is significantly enlarged, the main body will flex at the ridges causing the thin-film spacers to separate which in turn opens flow to the main body, essentially creating one main passage with a large diameter. When flow is stopped or decreased, the main body will restore elastically and resume shape as a flat pipe. According to the above, the present invention discloses a pipe which is easily stored and prevents twisting which could result in deformation, breakage and flow interference.

4 Claims, 6 Drawing Sheets

FLAT PIPE SUITABLE FOR VARIABLE FLOW CAPACITY

BACKGROUND OF THE INVENTION

1. Field of the Invention

The present invention relates to a flat pipe. More particularly, the present invention relates to a pipe which allows the varied pressure of air or liquid to flow through.

2. Description of Related Art

A conventional pipe, as shown in FIG. 5 and FIG. 6, is usually shaped as a flat pipe 20 or a simple circular pipe 30, wherein the flat pipe 20 comprises spacers 21 used to prevent the pipe from twisting that may result in deformation and breakage of the pipe, further interfering with flow. In addition, the design of the spacers 21 also provides an easy means of rolling the pipe for storage purposes. However, the design of the spacers 21 limits the flow capacity of the flat pipe 20 such that only a small volume of flow is capable of running through the passages 22, resulting in inconvenience to the user.

Regarding a circular pipe 30, although the diameter of the pipe is larger than that of a flat pipe and allows for higher flow capacity, the circular shape of the pipe makes rolling storage difficult. Additionally, the circular pipe 30, usually made of soft plastic, is easily deformed and broken by twisting when it has been used or stored because the circular pipe 30 has no internal structure designed to prevent twisting. This sort of deformation and breakage could cause flow interference.

The present invention is intended to improve upon the above mentioned drawbacks, including the storage difficulties and flow interference caused by twisting.

SUMMARY OF THE INVENTION

The primary object of the present invention is to provide a flat pipe that allows a variable flow capacity, and which comprises: a main body shaped as a flat tube wherein opposing ridges are installed at the inner upper and lower positions of the main body, and thin-film spacers installed between said pairs of ridges, which form multiple passages in the main body. Due to the flexibility of the thin-film spacers, the passages of the main body may stretch to a larger diameter to adjust to increased flow. If the flow is significantly enlarged, the main body will flex at the ridges causing the thin-film spacers to separate which in turn opens flow to the main body, essentially creating one main passage with a large diameter. When flow is stopped or decreased, the main body will restore elastically and resume shape as a flat pipe. According to the above, the present invention discloses a pipe which is easily rolled and stored and prevents twisting which could result in deformation, breakage and flow interference.

Other objects, advantages and novel features of the invention will become more apparent in the following detailed description taken in conjunction with the accompanying diagrams.

DETAILED DESCRIPTION OF PREFERRED EMBODIMENT

Figure 1:
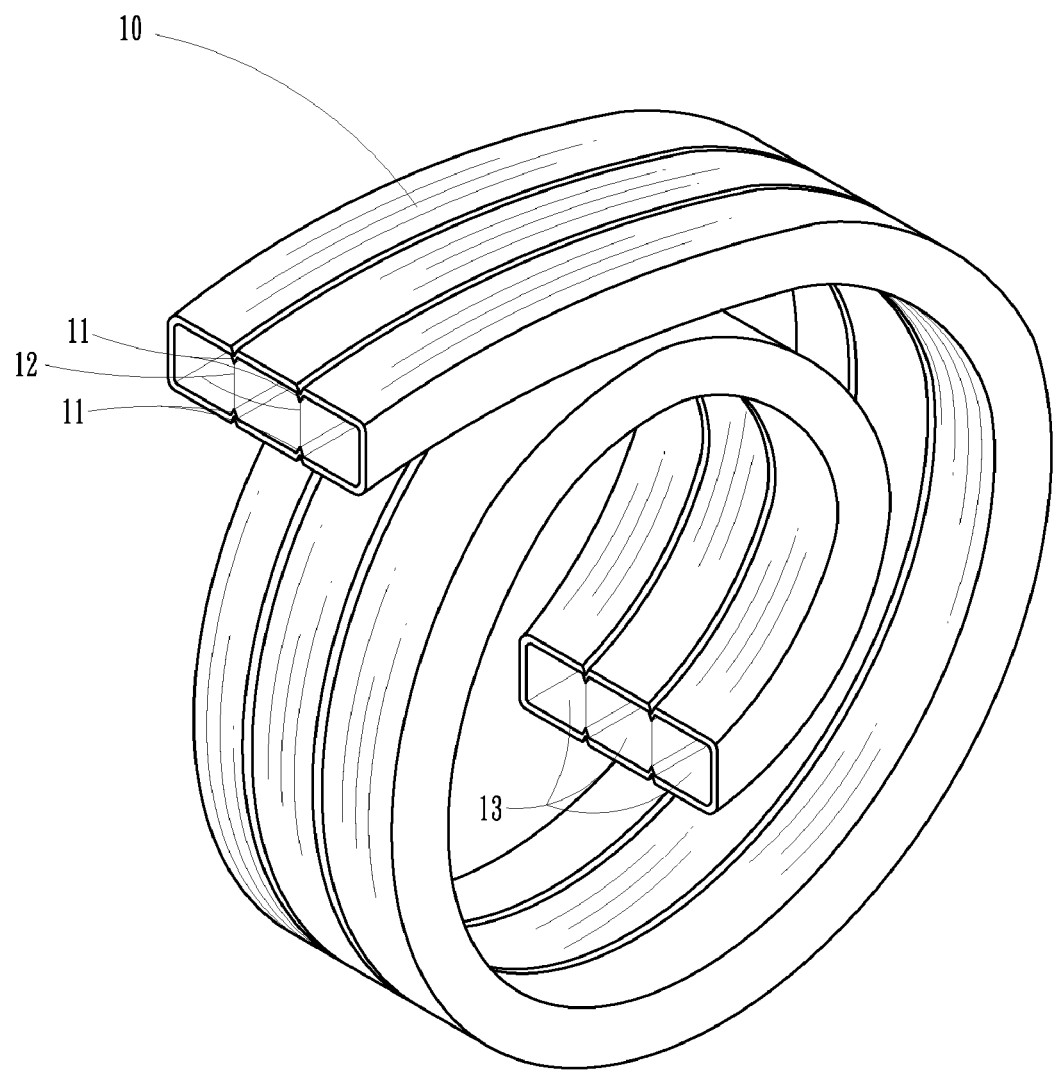
FIG. 1 is a perspective view schematically showing the flat pipe of the present invention.

While this invention is capable of embodiment in many different forms, shown in the drawings and herein described in detail is the preferred embodiment of the invention. The preferred embodiment is disclosed with the understanding that the present description is but one example of the principles of the invention and is not intended to limit the broad aspects of the invention to the single embodiment illustrated.

Figure 2:
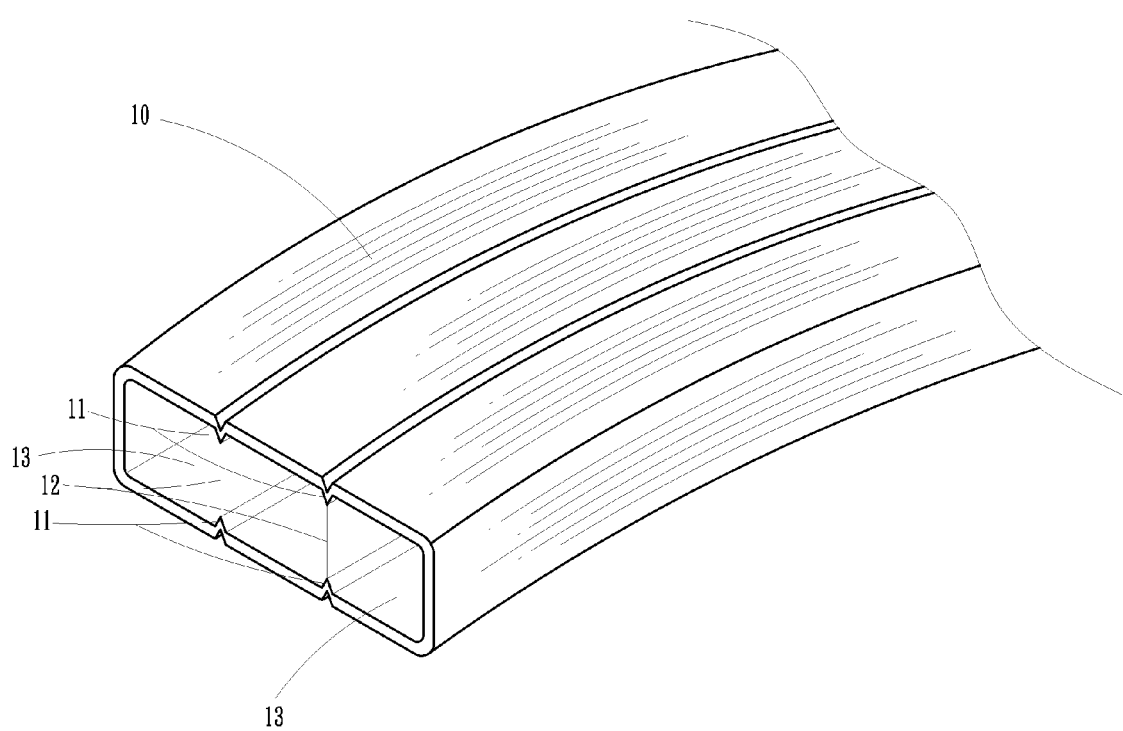
FIG. 2 is a partial, enlarged view schematically showing the flat pipe of the present invention.
Figure 3:
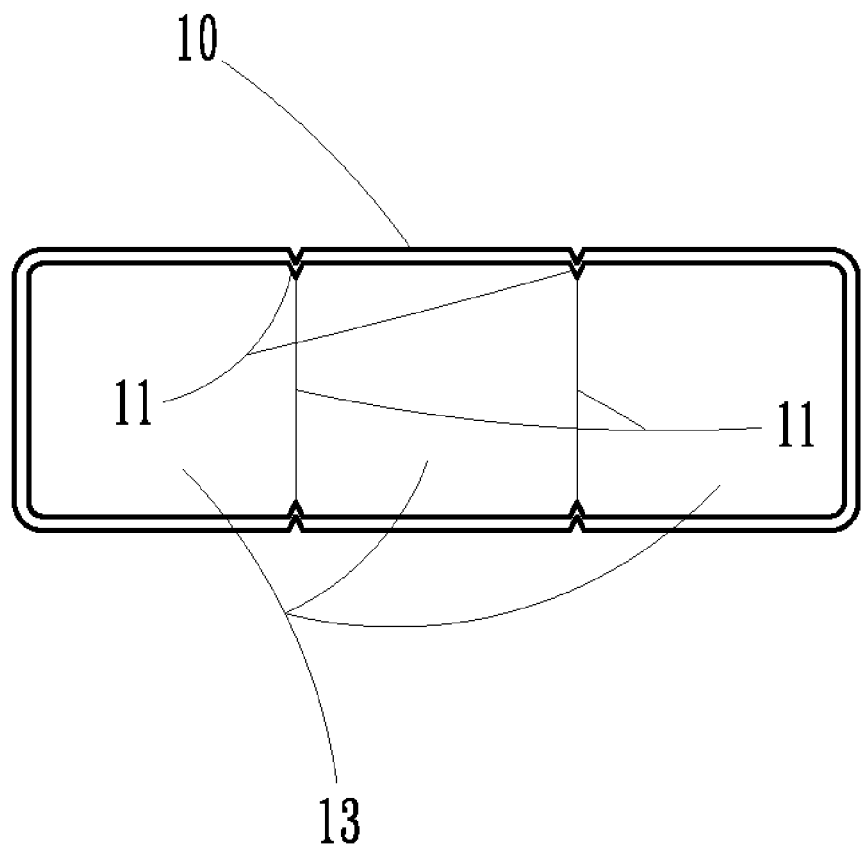
FIG. 3 is a front view schematically showing the flat pipe of the present invention.

FIGS. 1 to 3 are perspective, partial, enlarged and front views schematically showing a flat pipe of the present invention.

The pipe comprises:

a main body 10 shaped as a tube or flat tube wherein opposite pairs of ridges 11 are installed at the inner upper and lower positions of the main body 10, and thin-film spacers 12 installed between said pairs of ridges 11. The placement of the thin-film spacers 12, which are flexible and formed of a thin film, form multiple passages 13 in the main body 10.

In light of the structures described above, the present invention achieves the functions of a flat pipe that allows for varied flow pressure of a material, such as air or liquid.

Figure 4:
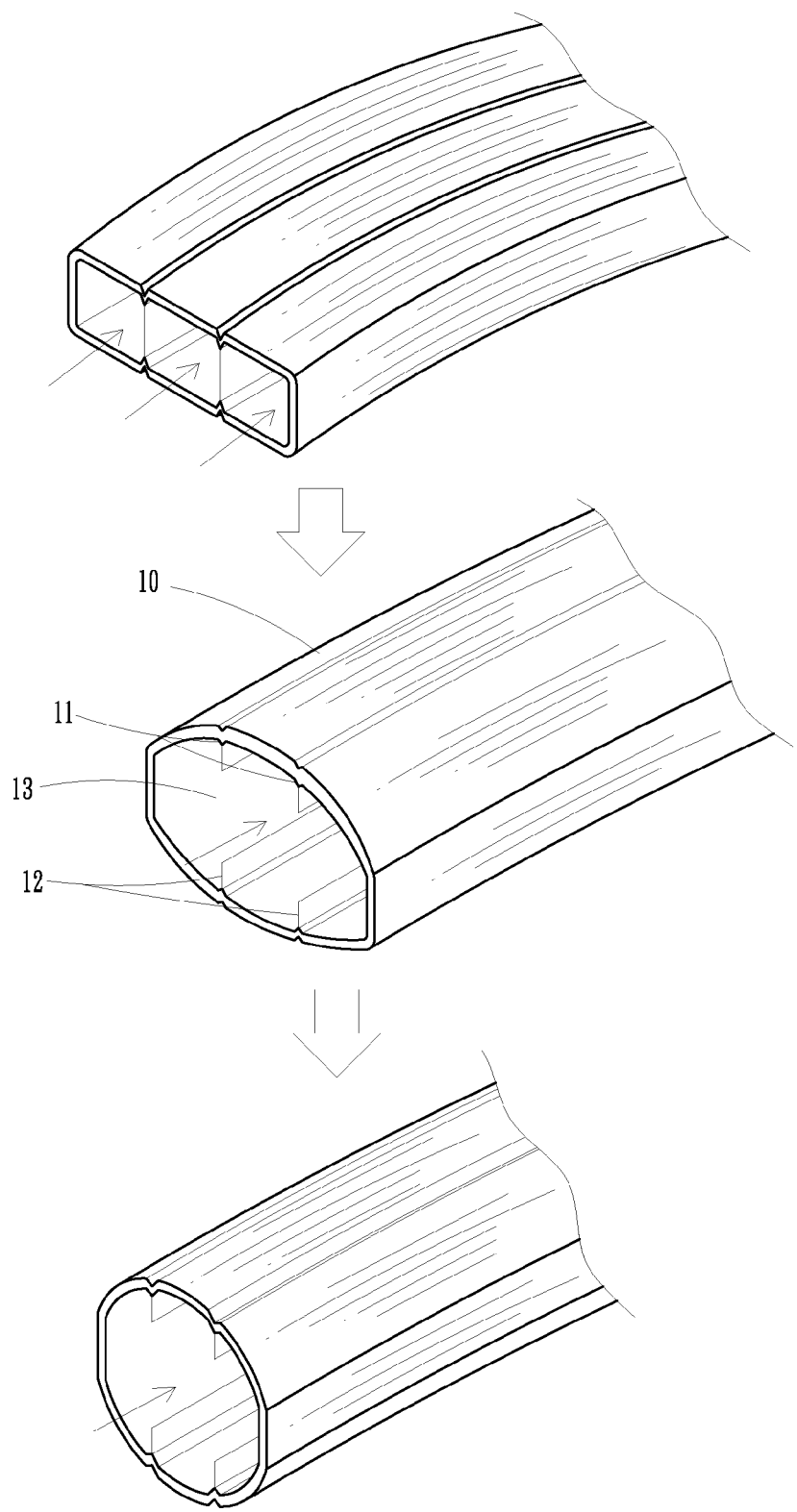
FIG. 4 is a perspective view schematically showing the practical use of the present invention.
Figure 5:
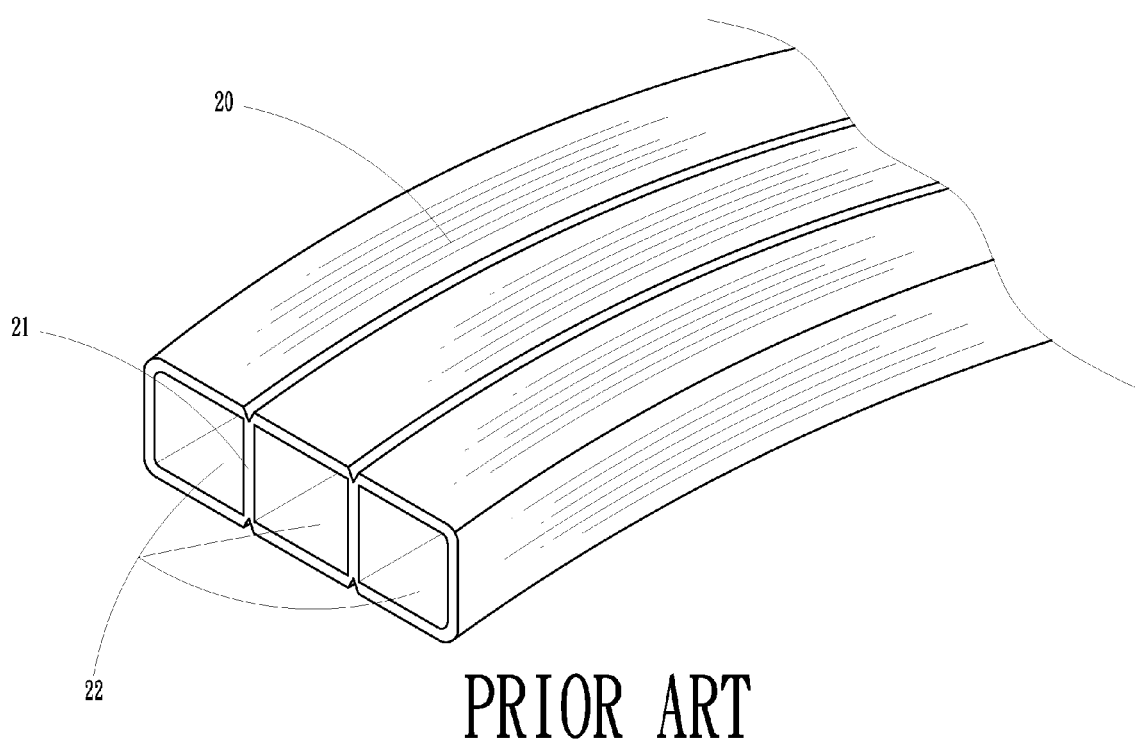
FIG. 5 is a perspective view schematically showing a conventional flat pipe.
Figure 6:
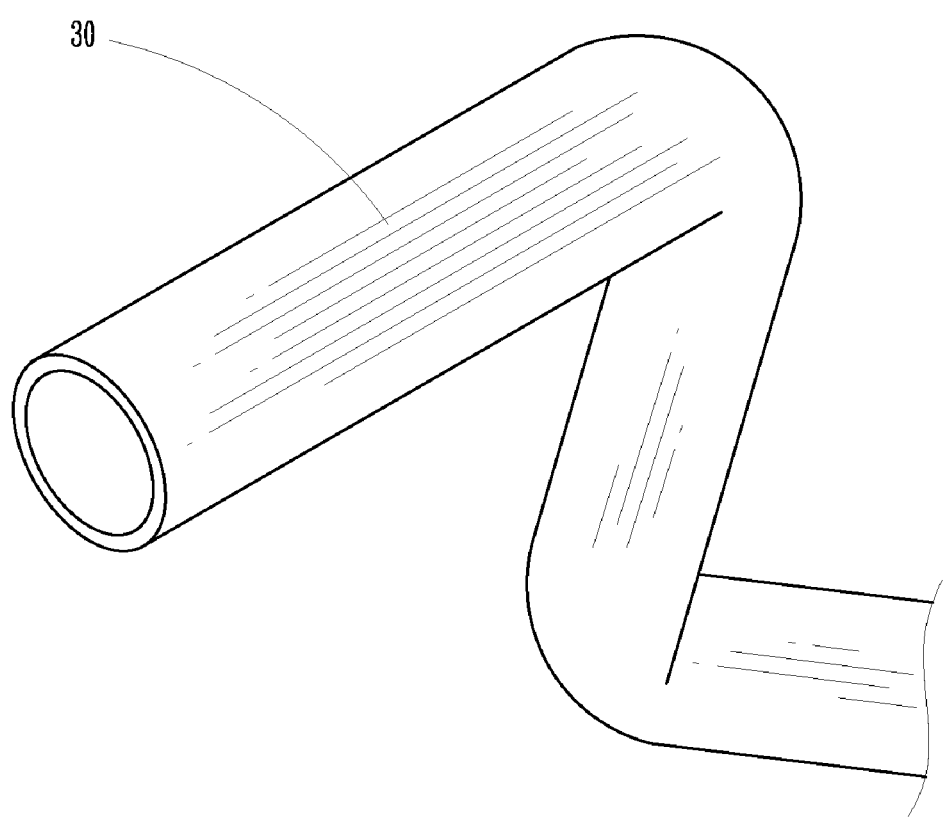
FIG. 6 is a perspective view schematically showing a conventional circular pipe.

FIG. 4 is a perspective view schematically showing the practical use of the present invention. If flow is increased, the main body 10 may flex at the ridges 11 and the thin-film spacers 12 can stretch so to increase passage diameter and flow capacity. If flow is further increased, the main body 10 will flex at the ridges 11 causing the thin-film spacers 12 to separate, effectively transferring flow from the multiple, smaller passages 13 formed by the thin-film spacers 12 to the main body 10, essentially creating one main passage 13 with a large diameter. When flow is stopped or decreased, the main body 10 will restore elastically and resume shape as a flat pipe. According to the above, the present invention discloses a pipe which is easily stored and prevents twisting which could result in deformation, breakage and flow interference.

Although numerous characteristics and advantages of the present invention have been set forth in the foregoing description, together with details of the structure and function of the invention, this disclosure is one example only, and changes may be made with regard to specific details, particularly in matters of shape, size, and arrangement of parts within the invention to the full extent indicated by the general meaning of the terms in which the appended claims are expressed.

What is claimed is:

1. A flat pipe, comprising:
   a main body shaped as a tube wherein opposing pairs of ridges are formed at inner upper and lower positions of the main body, and thin-film spacers are attached to and between said pairs of ridges, which form multiple passages in the main body through which material flows;
   the thin-film spacers are formed of a flexible thin, film-like material that can stretch to increase the passage diameters and flow capacity as a result of increased material flow, wherein
   the thin-film spacers separate when flow capacity significantly increases thereby creating one main passage.

2. A flat pipe as claimed in claim 1, wherein the main body is shaped as a flat tube.

3. A flat pipe as claimed in claim 1, wherein the material is a liquid.

4. A flat pipe as claimed in claim 1, wherein the material is air.

* * * * *